June 19, 1923.

W. N. BOOTH 1,459,011

WHEEL BORING AND FACING MACHINE

Filed July 5, 1918

Inventor
William N. Booth

By Whittemore Hulbert & Whittemore
Attorneys

June 19, 1923.

W. N. BOOTH 1,459,011

WHEEL BORING AND FACING MACHINE

Filed July 5, 1918

Inventor

William N. Booth

By Whittemore Hulbert & Whittemore

Attorney

Patented June 19, 1923.

1,459,011

UNITED STATES PATENT OFFICE.

WILLIAM N. BOOTH, OF DETROIT, MICHIGAN.

WHEEL BORING AND FACING MACHINE.

Application filed July 5, 1918. Serial No. 243,274.

*To all whom it may concern:*

Be it known that I, WILLIAM N. BOOTH, a citizen of the United States of America, residing at Detroit, in the county of Wayne and State of Michigan, have invented certain new and useful Improvements in Wheel Boring and Facing Machines, of which the following is a specification, reference being had therein to the accompanying drawings.

The invention relates to machines for boring and facing the hub portions of wooden-spoked vehicle wheels preparatory to the mounting of the metallic hubs thereon. It is the object of the invention to provide means for exactly gauging the wheels so that the dimension between the opposite faces is predetermined. It is a further object to expedite the work of boring and facing and to insure a true face on each side.

In the manufacture of wooden-spoked vehicle wheels the spokes which are pressed in the fellies and then into a metallic rim do not always lie in an exact plane but are slightly dished; furthermore the dishing of the wheel is not always the same and consequently in facing the hub portion the cut cannot be gauged from the setting of the periphery of the wheel. With my improved machine means is provided for facing the opposite sides of the wheel with a single chucking of the work, the facing being accomplished by successively operated cutters. Provision is also made for adjusting the cutter first operated so as to properly true up the faces of wheels having a varying dish, and after this first facing cut for operating the opposed cutter in predetermined relation to the cut first made, the specific construction being as follows:

Figure 1:
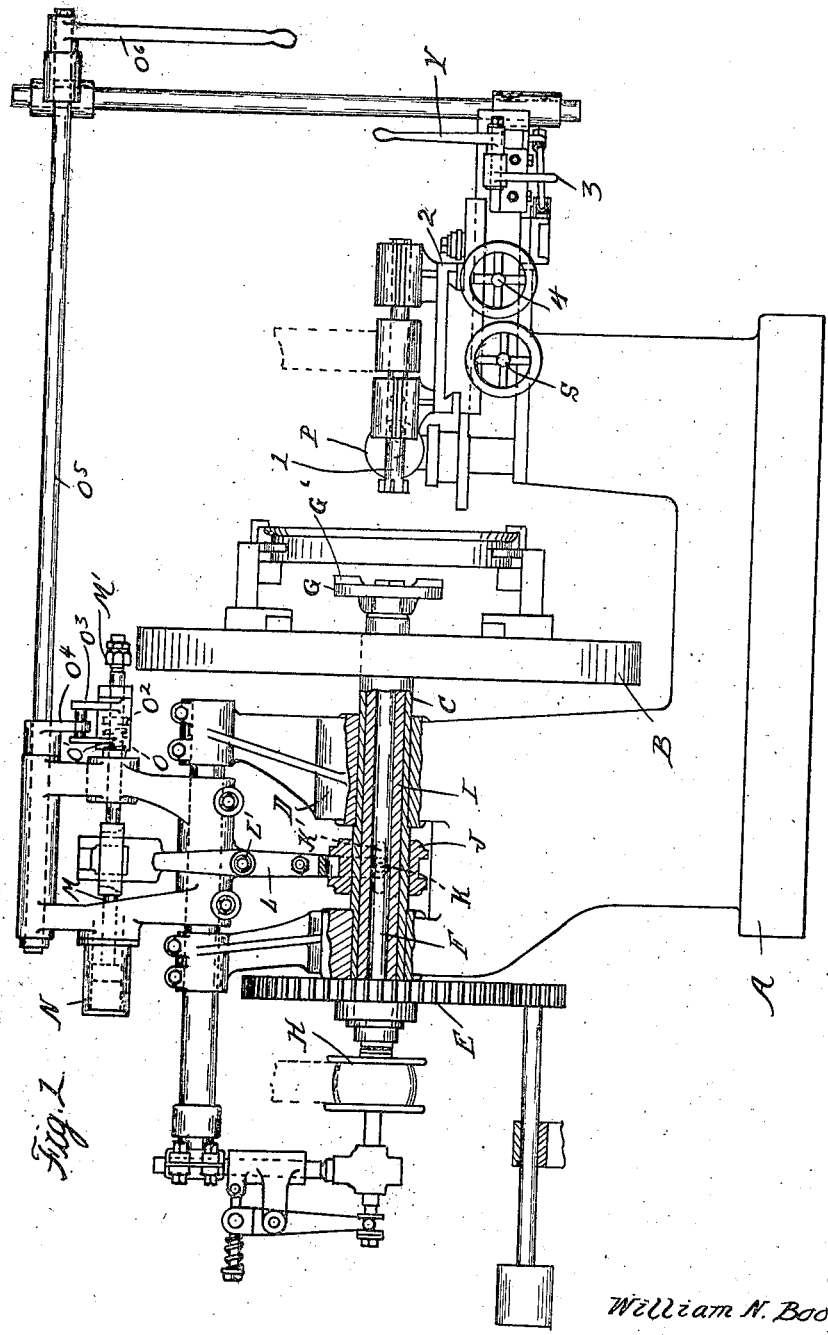
Figure 1 is a sectional side elevation of the machine.
Figure 2:
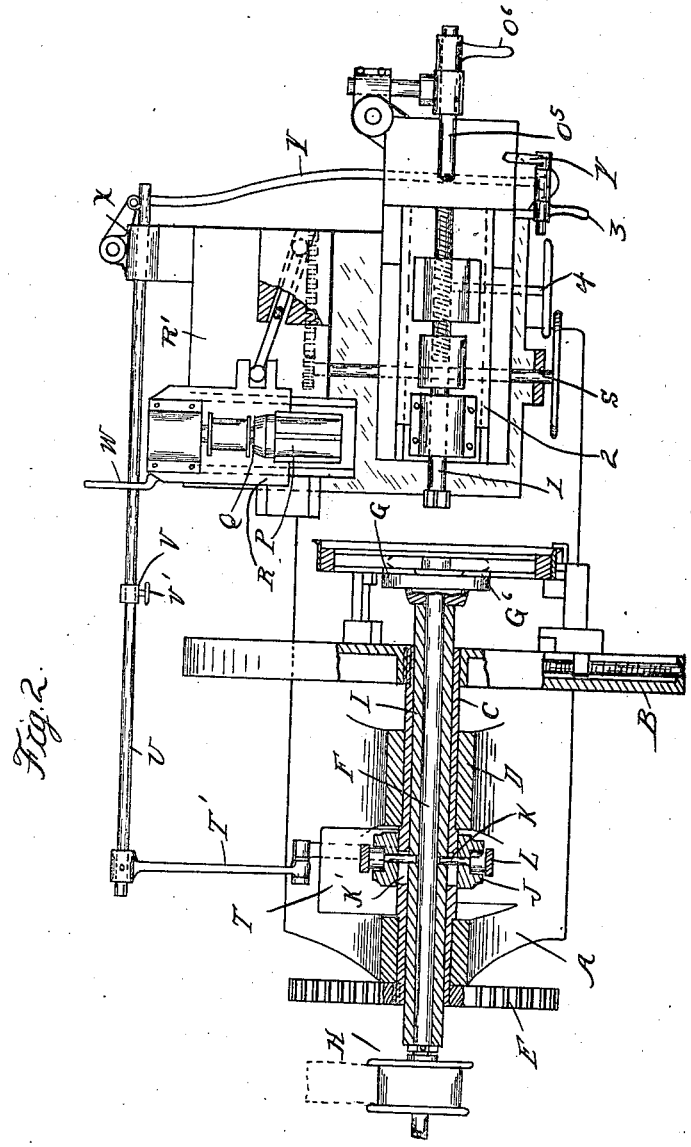
Figure 2 is a sectional plan view thereof.
Figure 3:
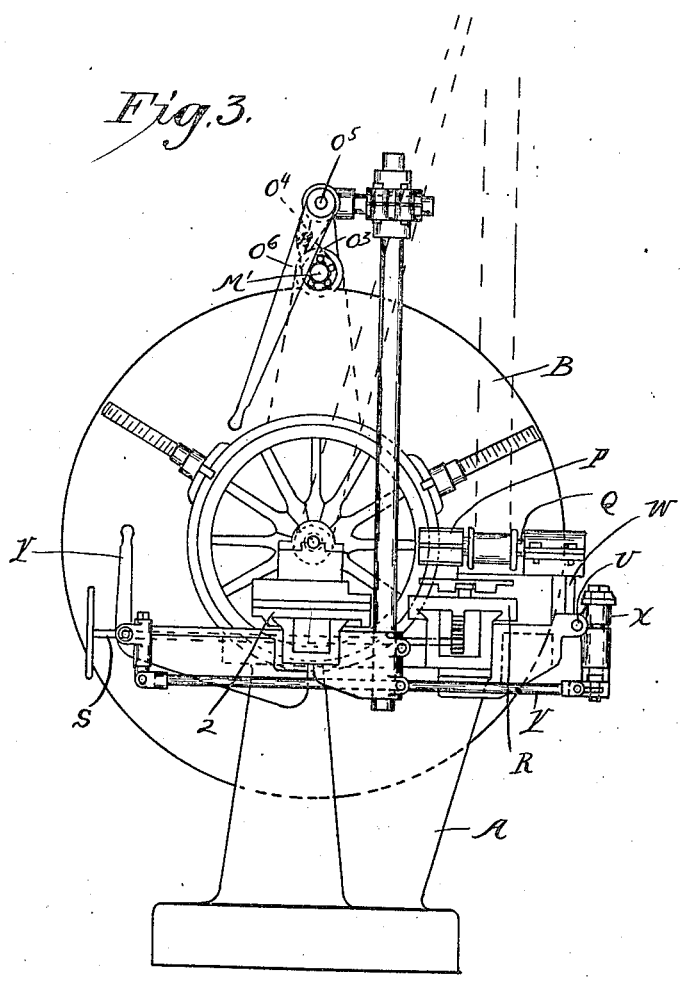
Figure 3 is an end elevation.

A is the frame or bed upon which is mounted the rotating chuck B for holding the wheels to be faced. This chuck is mounted on a rotary spindle C journaled in bearings D and driven by a clutch-controlled drive mechanism E. The spindle C is hollow and has longitudinally slidably secured therein the revoluble arbor F for a cutter G which faces the inner side of the wheel while engaged with the chuck. The arbor F is driven by a suitable drive connection H and is adjusted longitudinally by means of a sleeve I intermediate the same and the hollow spindle C, which is coupled with a collar J external to the spindle by pins K passing through longitudinal slots K' in said spindle. Thus the spindle, collar and sleeve will rotate together while the arbor F will revolve at a faster speed. At the same time the arbor is free to be adjusted longitudinally by a movement of the collar J which is communicated to the sleeve I and then to the arbor.

Adjustment of the collar J is controlled by an operating mechanism comprising a lever L forked to engage the collar and fulcrumed at L' upon the frame. The opposite end of this lever is connected to a plunger M which is actuated by a pneumatic motor N in a direction to move the arbor and cutter G towards the wheel in the chuck. The movement of the plunger is, however, limited by a stop O on the frame which is adjustable to permit of a varying movement, and positioning of the cutter when performing its work. Preferably this stop O comprises a stationary member O' on the frame having a steep pitched screw which engages a correspondingly threaded movable member $O^2$ rotated by a rock-arm $O^3$ which engages a rock-arm $O^4$ on a rock-shaft $O^5$, said shaft having a lever $O^6$ for rocking the same. The arrangement is such that the movement of the lever $O^6$ will cause the movement of the member $O^2$ in one direction or the other upon the screw O' and will therefore alter the position of the stop shoulder. The plunger rod M is provided with a collar M' for engaging the stop shoulder and consequently the degree of movement of said plunger and of the cutter G is controlled by the position of the stop.

The outer face of the wheel is trued by a cutter P on a revolving arbor Q which is carried upon a transversely adjustable slide R mounted on a longitudinally adjustable slide R' on the bed. Operating mechanism S is adapted to move the cutter towards or from the work, this mechanism when actuated moving the cutter both transversely of the wheel in the chuck and toward and away from its face. In order to exactly gauge the thickness of the wheel the cutter P must be adjusted to a position in exactly predetermined relation to that of the cutter G when the latter completes the facing cut on the opposite side of the wheel. This is accomplished by a stop mechanism for the slide R' which is adjusted by a movement of the cutter G and is then locked so as to arrest movement of the operating mechanism S and cutter P. As shown this stop mechanism comprises a slide T connected to be actuated by the collar J and having an arm T' connected to a rod U on which is arranged a stop collar V. This collar is adjustably secured in position by suitable means such as a set-screw V', but when once set will remain in fixed relation to the rod and will form a stop for a shoulder W on the slide R'. To hold the rod U stationary a clamping bearing X is arranged to engage the same, and this bearing is controlled by a lever Y arranged in proximity to the hand wheel for actuating the operating mechanism and also to the lever O⁶. For boring the wheel a suitable boring spindle 1 is mounted upon an adjustable slide 2 which is actuated by an operating mechanism 4, the hand wheel of which is in proximity to the hand wheel for the mechanism S and the levers Y and O⁶. The lever 3 also in proximity to the hand wheels, and levers above mentioned controls the passage of the compressed air to and from the pneumatic motor N.

In operation the wheels to be bored and faced are successively placed in engagement with the chuck B which is then set in motion by the mechanism E. The operator first bores the wheel by adjusting the hand wheel of the operating mechanism 4, which actuates the slide 2 and the boring spindle 1 carried thereby. At the completion of this operation and after the withdrawal of the boring tool the facing tool G is actuated by the admission of air to the cylinder N through a suitable valve, controlled by the lever 3. This will move the tool G in proximity to the wheel but in the initial position of the stop O the cutter will be held from contact with the work. The operator then moves the lever O⁶, which by rocking the shaft O⁵ and the rock-arms O⁴ and O³ will screw the member O² inward, permitting further movement of the stop collar M' and plunger M. This will also permit the cutter G to approach the work, and when the face of the wheel is trued up further movement is prevented by actuating the lever Y. This lever, as has been explained, will lock the clamping bearing X, holding the rod U stationary, and through the connecting arm T', slide T and collar J will hold the cutter G. The operator then actuates the hand wheel for the operating mechanism S which moves the slide R towards the work, causing the cutter P to face the opposite side of the wheel and to continue the cut until further movement is arrested by the stop collar V. As this collar has been accurately positioned upon the rod U, the thickness of the wheel between the opposite faces thereof will be the predetermined dimension.

What I claim as my invention is:

1. In a wheel facing machine, the combination with a cutter for one face of the wheel variably movable, of a cutter for facing the opposite side of the wheel, and means positioned by the first-mentioned cutter for limiting the movement of the last-mentioned cutter.

2. The combination with a facing cutter and means for moving the same to variable positions, of an opposed facing cutter, and means positioned by the operation of the first-mentioned cutter for limiting the movement of the last-mentioned cutter.

3. The combination with opposed facing cutters arranged upon opposite sides of the work, of means for variably moving one of said cutters, a member positioned by the operation of said cutter, a stop adjustably secured to said member, and means for operating the opposed cutter limited by said stop.

4. The combination with opposed facing cutters arranged upon opposite sides of the work, of means for variably adjusting one of said cutters towards the work, a member positioned by said actuating means, a stop adjustably secured to said member, means for locking said member to hold said cutter and stop from movement, and means for actuating the opposed cutter towards the work limited by said stop.

5. The combination with opposed facing cutters arranged upon opposite sides of the work, of power means for adjusting one of said cutters towards the work, a stop for limiting movement of said cutter, manually operable means for varying the position of said stop, a member movable with said cutter, a stop adjustably secured to said member, means for locking said member from movement, and means for adjusting the opposed cutter towards the work limited by said last-mentioned stop.

6. The combination with a rotary wheel engaging chuck, of a cutter for engaging the inner face of said wheel, a spindle for said cutter passing axially through said chuck, mechanism for adjusting said spindle including a pneumatic motor, a stop for limiting movement of said motor and manually-operable means for adjusting the position of said stop, a rod connected with said cutter-actuating mechanism, a stop adjustably mounted on said rod, means for locking said rod from movement, and means for adjusting the opposed cutter towards the work limited by said last-mentioned stop.

7. In a wheel facing machine, the combination with a cutter for facing one side of the wheel movable variably toward the wheel, of a cutter for facing the opposite side of the wheel movable variably toward the wheel, and means for variably limiting the movement of said last-mentioned cutter toward the wheel in accordance with the movement of said first-mentioned cutter toward the wheel.

8. In a wheel facing machine, the combination with a cutter for facing one side of the wheel movable variably toward the wheel, of a second cutter for facing the opposite side of the wheel movable variably toward the wheel, and means for variably limiting the movement of said second cutter toward the wheel, said limiting means having a predetermined position relative to said first-mentioned cutter when in its wheel facing position.

In testimony whereof I affix my signature.

WILLIAM N. BOOTH.